(12) United States Patent
Hijikata

(10) Patent No.: US 7,006,917 B2
(45) Date of Patent: Feb. 28, 2006

(54) DRIVING ASSIST SYSTEM FOR VEHICLE

(75) Inventor: Shunsuke Hijikata, Kamakura (JP)

(73) Assignee: Nissan Motor Co., Ltd., Kanagasawa-ken (JP)

( * ) Notice: Subject to any disclaimer, the term of this patent is extended or adjusted under 35 U.S.C. 154(b) by 174 days.

(21) Appl. No.: 10/682,959

(22) Filed: Oct. 14, 2003

(65) Prior Publication Data

US 2004/0080405 A1    Apr. 29, 2004

(30) Foreign Application Priority Data

Dec. 6, 2002  (JP) .............................. 2002-355232

(51) Int. Cl.
*B60K 28/02*    (2006.01)

(52) U.S. Cl. .................... 701/301; 701/36; 342/70; 340/436; 340/903

(58) Field of Classification Search ................. 701/36, 701/93, 96, 301; 342/70, 71; 340/436, 903
See application file for complete search history.

(56) References Cited

U.S. PATENT DOCUMENTS

| | | | |
|---|---|---|---|
| 6,275,773 B1 | 8/2001 | Lemelson et al. | |
| 6,832,157 B1 * | 12/2004 | Egami | 701/301 |
| 6,873,911 B1 * | 3/2005 | Nishira et al. | 701/301 |
| 2003/0163240 A1 * | 8/2003 | Egami | 701/96 |
| 2004/0059482 A1 * | 3/2004 | Hijikata | 701/36 |
| 2004/0172185 A1 * | 9/2004 | Yamamura et al. | 701/96 |
| 2004/0249549 A1 * | 12/2004 | Kondoh et al. | 701/96 |
| 2004/0249550 A1 | 12/2004 | Yamamura et al. | |
| 2005/0033517 A1 * | 2/2005 | Kondoh et al. | 701/301 |
| 2005/0065687 A1 * | 3/2005 | Hijikata et al. | 701/41 |
| 2005/0090984 A1 * | 4/2005 | Kobayashi et al. | 701/301 |

FOREIGN PATENT DOCUMENTS

| | | |
|---|---|---|
| JP | 51-7892 B | 3/1976 |
| JP | 10-166889 | 6/1998 |
| JP | 10-166890 | 6/1998 |
| JP | 10-211886 | 11/1998 |
| JP | 11-348799 | 12/1999 |
| JP | P2000-54860 A | 2/2000 |
| JP | 2000-215396 | 8/2000 |
| JP | 2002-323565 | 11/2002 |
| JP | 2003-063430 | 3/2003 |

OTHER PUBLICATIONS

U.S. Appl. No. 10/967,229, filed Oct. 19, 2004, entitled: Driving Assist System for Vehicle, Yosuke Kobayashi et al.

* cited by examiner

*Primary Examiner*—Gary Chin
(74) *Attorney, Agent, or Firm*—McDermott Will & Emery LLP

(57) ABSTRACT

A vehicle driving assist system of the present invention detects a vehicle condition and a traveling environment of a subject vehicle; and calculates risk potential around the subject vehicle. The vehicle driving assist system calculates operation reaction force based on the risk potential around the subject vehicle, and corrects it according to operating state of an accelerator pedal. The corrected operation reaction force is generated in the accelerator pedal.

15 Claims, 13 Drawing Sheets

DRIVING ASSIST SYSTEM FOR VEHICLE

BACKGROUND OF THE INVENTION

1. Field of the Invention

The present invention relates to technology for assisting driver's operations, more particularly, to a driving assist system for a vehicle that assists operations by a driver.

2. Description of Related Art

Systems employed to assist driver operations in the related art include the system disclosed in Japanese Laid Open Patent Publication No. H10-166889. This system adjusts reaction force generated when an accelerator pedal is operated, based on a distance between a subject vehicle and a preceding vehicle detected by a distance detector. This system gives a warning to the driver by increasing the operation reaction force of the accelerator pedal as the distance between vehicles decreases.

SUMMARY OF THE INVENTION

However, the driver's perception of the accelerator pedal reaction force depends on his condition. In other words, it is difficult to warn the driver in a manner appropriate to his perception by controlling the accelerator pedal reaction force based on the distance between the subject vehicle and the preceding vehicle.

The present invention is to provide a driving assist system for a vehicle capable of conveying a risk potential in a manner appropriate to the state of the driver's perception.

A driving assist system for a vehicle according to the present invention comprises: a driving state recognition device that detects a vehicle condition and a traveling environment of a subject vehicle; a risk potential calculation device that calculates risk potential around the subject vehicle based on signals from the driving state recognition device; a reaction force control device that controls operation reaction force to be generated in a vehicle operating unit, based on the risk potential calculated by the risk potential calculation device; an operating state detection device that detects operating state of the vehicle operating unit by a driver; and a reaction force correction device that corrects the operation reaction force of the vehicle operating unit controlled by the reaction force control device, based on signals from the operating state detection device.

A driving assist system for a vehicle according to the present invention comprises: a driving state recognition means for detecting a vehicle condition and a traveling environment of a subject vehicle; a risk potential calculation means for calculating risk potential around the subject vehicle based on signals from the driving state recognition means; a reaction force control means for controlling operation reaction force to be generated in a vehicle operating unit, based on the risk potential calculated by the risk potential calculation means; an operating state detection means for detecting operating state of the vehicle operating unit by a driver; and a reaction force correction means for correcting the reaction force of the vehicle operating unit controlled by the reaction force control means, based on signals from the operating state detection means.

A vehicle driving assist method according to the present invention: detects a vehicle condition and a traveling environment of a subject vehicle; calculates risk potential around the subject vehicle based on the vehicle condition and the traveling environment having been detected; detects operating state of a vehicle operating unit by a driver; and controls operation reaction force to be generated in the vehicle operating unit, based on the risk potential and the operating state of the vehicle operating unit.

A vehicle according to the present invention, comprises: a vehicle operating unit; a driving state recognition device that detects a vehicle condition and a traveling environment of the vehicle; a risk potential calculation device that calculates risk potential around the vehicle based on signals from the driving state recognition device; a reaction force control device that controls operation reaction force to be generated in the vehicle operating unit, based on the risk potential calculated by the risk potential calculation device; an operating state detection device that detects operating state of the vehicle operating unit by a driver; and a reaction force correction device that corrects the operation reaction force of the vehicle operating unit controlled by the reaction force control device, based on signals from the operating state detection device.

DESCRIPTION OF THE PREFERRED EMBODIMENT

First Embodiment

Figure 1:
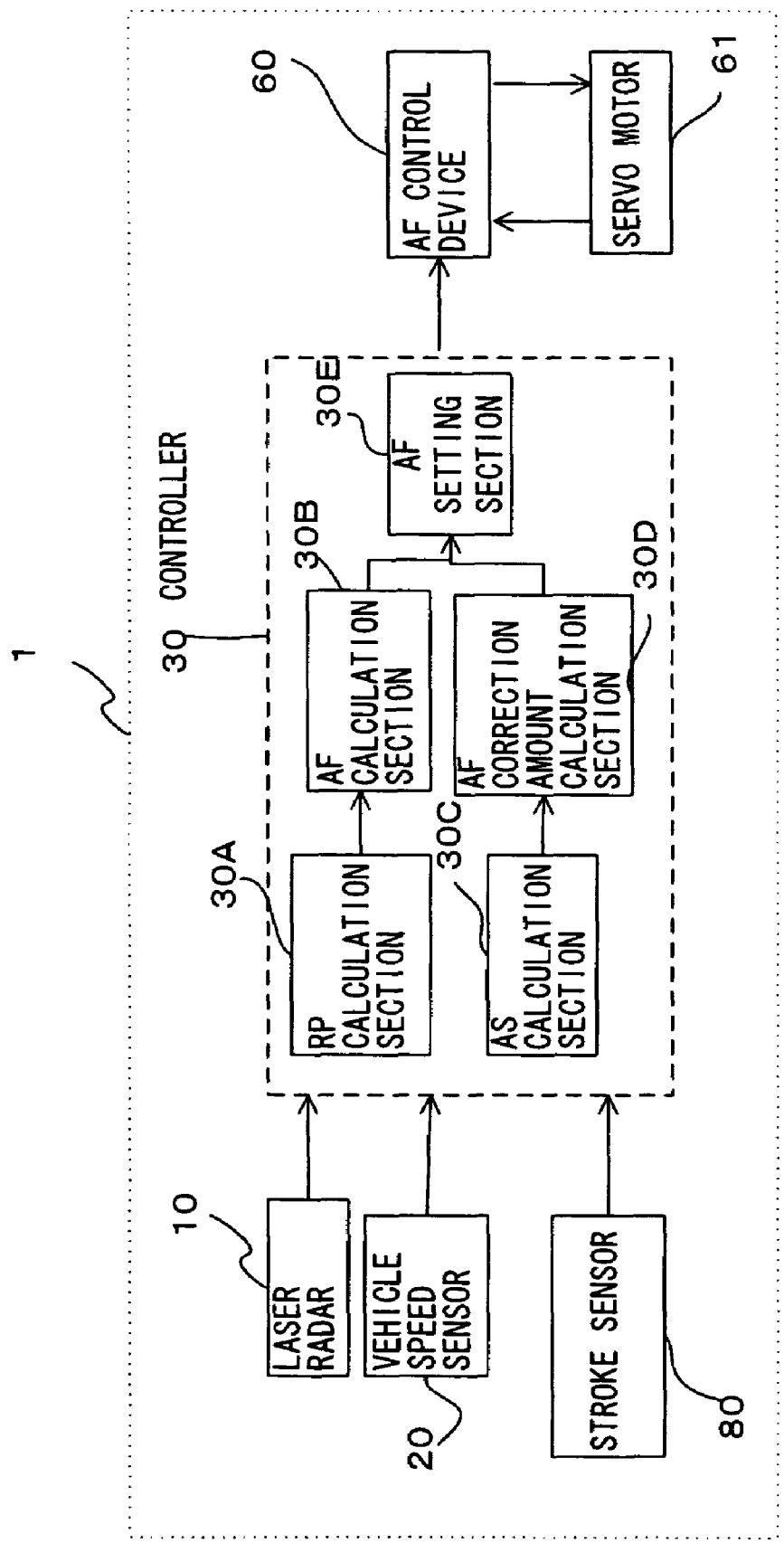
FIG. 1 is a block diagram showing the structure of a driving assist system for a vehicle according to an embodiment of the present invention.
Figure 2:
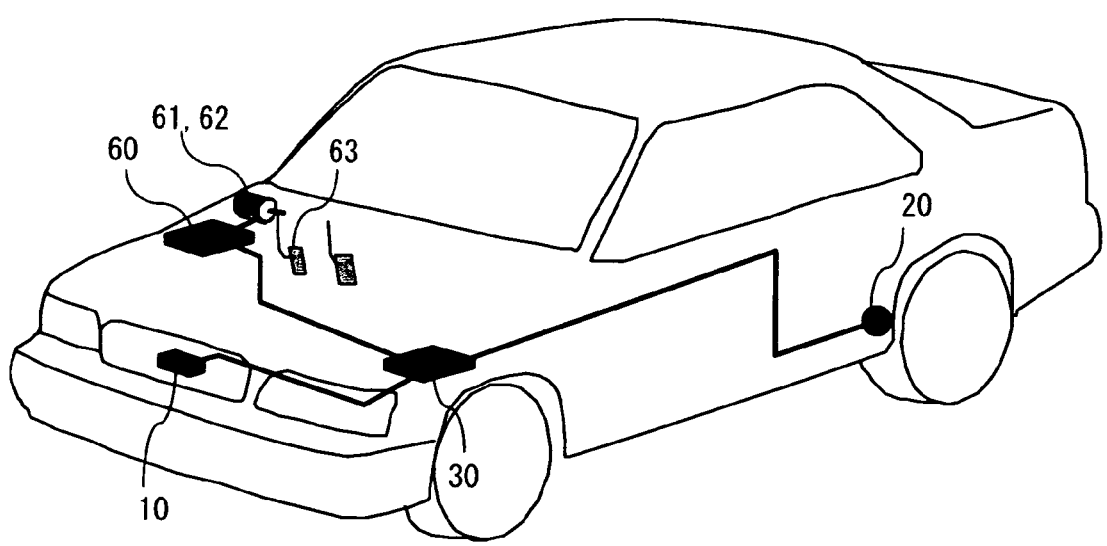
FIG. 2 is a structural diagram of a vehicle fitted with the vehicle driving assist system shown in FIG. 1.
Figure 3:
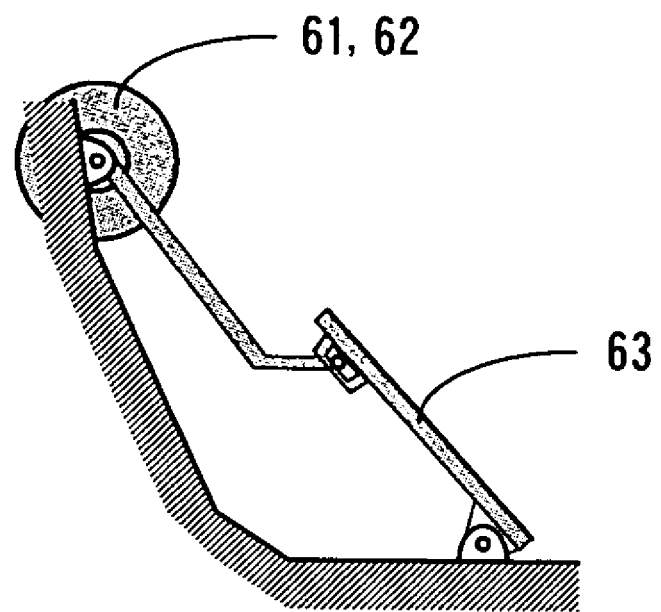
FIG. 3 is a structural diagram of an accelerator pedal and the vicinity thereof.

A vehicle driving assist system according to a first embodiment of the present invention will be described referring to the drawings. FIG. 1 shows the structure of a vehicle driving assist system 1 of the first embodiment, and FIG. 2 is a structural diagram of a vehicle fitted with the vehicle driving assist system 1. FIG. 3 is a structural diagram of an accelerator pedal and the vicinity thereof.

First of all, the structure of the vehicle driving assist system will be described.

A laser radar 10 is attached to a front grill of the vehicle or to a bumper etc., and propagates infrared pulses in a forward horizontal direction for scanning. The laser radar 10 measures reflected radiation of infrared pulses reflected by a plurality of reflecting objects ahead, such as the rear of a vehicle in front, and detects distance (vehicle distance) from the subject vehicle to a preceding vehicle and relative velocity (relative speed) of vehicles based on the elapsed time the reflected radiation to be received. The laser radar 10 outputs the detected vehicle distance and relative speed between vehicles to a controller 30. The laser radar 10 can scan the forward region which is about 6 degrees each side of an axis parallel to the vehicle longitudinal centerline, and objects existing within this range are detected.

A vehicle speed sensor 20 detects traveling speed of the subject vehicle from rotational speed of a wheel thereof or rotational speed of an output shaft of a transmission, and outputs the vehicle speed to the controller 30.

As shown in FIG. 3, a servo motor 61 and an accelerator pedal stroke sensor 62 are connected to an accelerator pedal 63 via a link mechanism. The accelerator pedal stroke sensor 62 detects an operation amount of the accelerator pedal 63 converted to a rotation angle of the servo motor 61 through the link mechanism. The accelerator pedal stroke sensor 63 outputs the detected amount to the controller 30.

The controller 30 performs overall control of the vehicle driving assist system 1. The controller 30 detects obstacle situation around the subject vehicle based on signals input from the laser radar 10 and the vehicle speed sensor 20, and calculates risk potential of the subject vehicle with respect to the preceding vehicle based on the detected obstacle situation. The controller 30 then performs the accelerator pedal reaction force control according to the risk potential thus calculated as will be described later.

An accelerator pedal reaction force control device (AF control device) 60 controls the servo motor 61 built into the link mechanism of the accelerator pedal 63 according to a signal from the controller 30. The servo motor 61 controls torque and rotation angle thereof in response to commands from the AF control device 60 so as to control reaction force generated when the driver operates the accelerator pedal 63.

Figure 4:
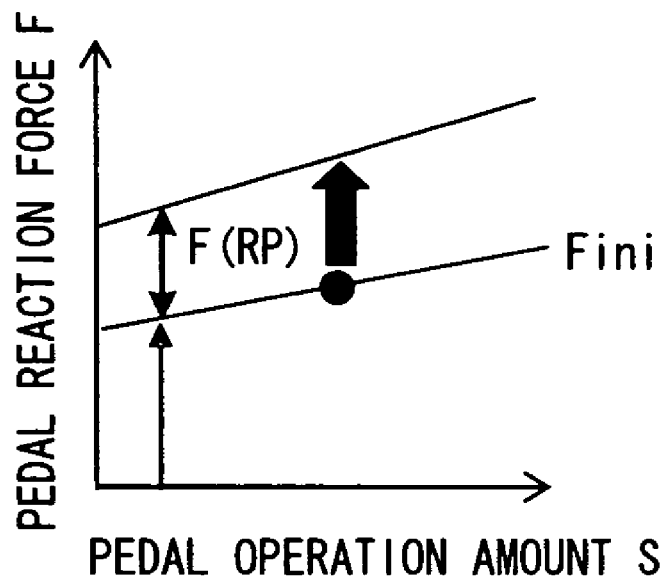
FIG. 4 is a figure showing a relationship between an accelerator pedal operation amount and an accelerator pedal reaction force.

FIG. 4 shows a relationship between the accelerator pedal operation amount S and the accelerator pedal reaction force F. When the accelerator pedal reaction force control according to the risk potential is not being performed, the accelerator pedal reaction force F may increase linearly along with increase of the operation amount S of the accelerator pedal 63 as shown in FIG. 4. The function Fini of the accelerator pedal reaction force F with respect to the accelerator pedal operation amount S when the accelerator pedal reaction force control is not being carried out is taken as being a normal reaction force characteristic. The normal reaction force characteristic Fini may be obtained, for example, by spring force of a torsion spring (not shown in the drawings) provided at the center of rotation of the servo motor 61.

The controller 30 comprises a CPU and CPU peripheral devices, such as ROM, RAM etc. The controller 30 constitutes a risk potential calculation section (RP calculation section) 30A, a reaction force calculation section (AF calculation section) 30B, an accelerator pedal operation speed calculation section (AS calculation section) 30C, a reaction force correction amount calculation section (AF correction amount calculation section) 30D, and a reaction force setting section (AF setting section) 30E in the form of software in CPU.

The RP calculation section 30A calculates the risk potential RP according to traveling state of the subject vehicle and the surrounding environment based on signals input from the laser radar 10 and the vehicle speed sensor 20. The risk potential RP calculated in the RP calculation section 30A is output to the AF calculation section 30B.

The AF calculation section 30B calculates an amount F(RP) of the accelerator pedal reaction force to be increased based on the risk potential RP calculated in the RP calculation section 30A.

The AS calculation section 30C calculates operating speed Vp of the accelerator pedal 63 by using the accelerator pedal operation amount S input from the stroke sensor 62. For instance, the operating speed Vp may be calculated from changes in the accelerator pedal operation amount S along time stored in a memory of the controller 30.

The AF correction amount calculation section 30D calculates a reaction force correction amount (AF correction amount) $\Delta F(Vp)$ for correcting the accelerator pedal reaction force based on the operating speed Vp calculated in the AS calculation section 30C.

The AF setting section 30E calculates a reaction force control amount (AF control amount) $\Delta F$ to output to the AF control device 60 using the AF increase amount F(RP) calculated in the AF calculation section 30B and the AF correction amount $\Delta F(Vp)$ calculated in the AF correction amount calculation section 30D.

Next, operation of the vehicle driving assist system 1 of the first embodiment will be described. First of all, the outline of the operation is explained.

When a driver operates the accelerator pedal 63, he feels the reaction force of the accelerator pedal 63 as force acting in a direction of releasing the accelerator pedal 63 (pushing-back force). When the driver is depressing the accelerator pedal 63, the pedal reaction force F corresponding to the pedal operation amount S is generated according to the normal accelerator pedal reaction force characteristic Fini of the FIG. 4. Accordingly, the driver feels the pushing-back force generated in a direction opposite to the depressing of the accelerator pedal 63. When the driver depresses the accelerator pedal 63 intently, that is, when the driver presses down the pedal quickly, he feels greater pushing-back force. On the other hand, when the driver is releasing the accelerator pedal 63, he does not feel the pushing-back force from the accelerator pedal 63 easily since the direction in which the accelerator pedal 63 is operated is the same as the direction of the pushing-back force from the accelerator pedal 63. As the driver releases the accelerator pedal more quickly, it becomes difficult for the driver to notice the pushing-back force from the pedal further more.

Thus, even when the same accelerator pedal reaction force F is generated for the same risk potential RP, the driver's perception of the accelerator pedal reaction force F is not always the same, depending on operating state of the accelerator pedal 63.

In the first embodiment of the present invention, the accelerator pedal reaction force F is corrected by taking into account of the pushing-back force from the accelerator pedal 63 that the driver perceives so that the risk potential RP in the vehicle surroundings is conveyed to the driver accurately regardless of operating state of the driver. In the first embodiment, driver's operating state is determined using the operating speed Vp of the accelerator pedal 63.

Figure 5:
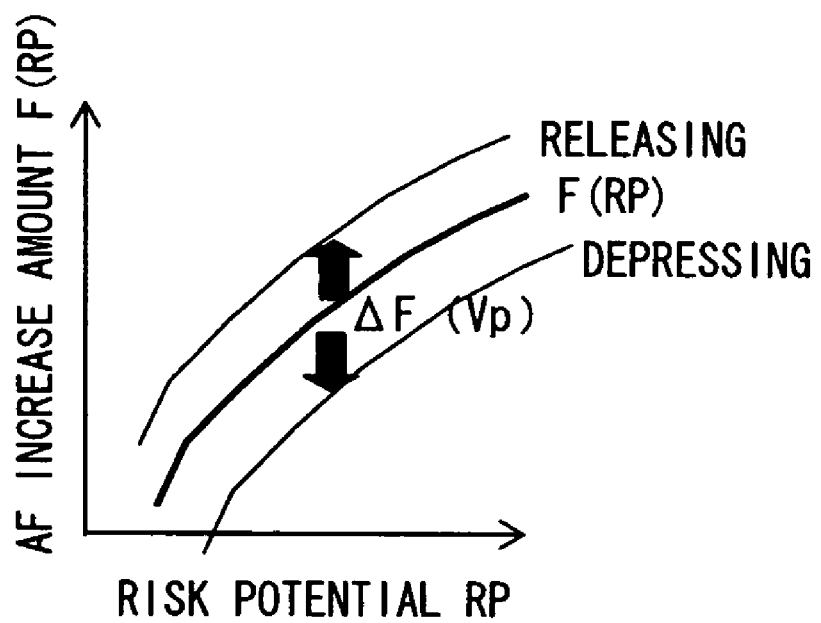
FIG. 5 illustrates the concept of reaction force correction in a first embodiment.

FIG. 5 schematically illustrates the relationship among the risk potential RP, the AF increase amount F(RP), and the AF correction amount ΔF(Vp).

The AF increase amount F(RP) increases as the risk potential RP becomes greater. When the accelerator pedal 63 is being depressed as shown in FIG. 5, the AF increase amount F(RP) is adjusted by setting the AF correction amount ΔF(Vp) to decrease the accelerator pedal reaction force F. In addition, the AF increase amount F(RP) is set so that the accelerator pedal reaction force F becomes smaller as the depressing speed Vp of the accelerator pedal 63 increases.

On the other hand, when the accelerator pedal 63 is being released, the AF increase amount F(RP) is adjusted by setting the AF correction amount ΔF(Vp) to increase the accelerator pedal reaction force F. In addition, the AF increase amount F(RP) is set so that the accelerator pedal reaction force F becomes greater as the releasing speed Vp of the accelerator pedal 63 increases.

Figure 6:
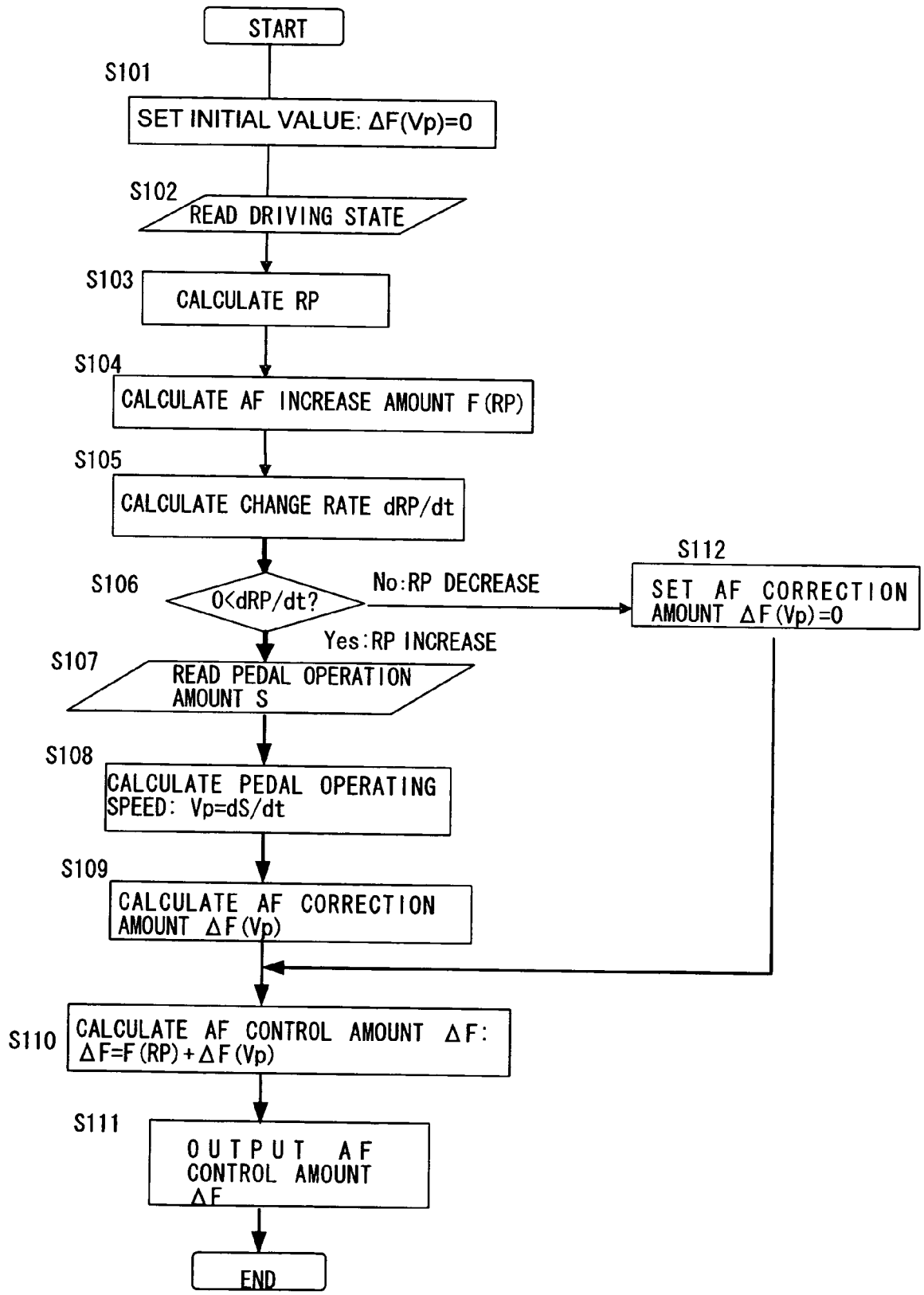
FIG. 6 is a flow chart showing the procedural flow of accelerator pedal reaction force control program executed in the first embodiment.

Hereafter, how to control the accelerator reaction force F in the above mentioned control will be described in detail, referring to FIG. 6. FIG. 6 is a flow chart showing the procedural flow of a drive operation assist control program executed in the controller 30. These processing procedures are executed in the controller 30 continuously at predetermined time intervals of, e.g., 50 msec.

In step S101, the AF correction amount ΔF(Vp) is set to 0 as an initial value.

In step S102, driving conditions in the vehicle surroundings, such as traveling state of the subject vehicle and obstacle condition around the subject vehicle are read. In particular, a distance D between the subject vehicle and an obstacle, for instance a preceding vehicle in front of the subject vehicle, and a relative speed Vr between the subject vehicle and the preceding vehicle detected by the laser radar 10 are read. In addition, a subject vehicle speed Vf detected by the vehicle speed sensor 20 is read.

In step S103, the risk potential RP in the vehicle surroundings is calculated based on data of the driving conditions read in step S102. First of all, time to contact (TTC) and time headway (THW) with respect to the obstacle having been recognized are calculated in order to calculate the risk potential RP.

TTC is a physical quantity representing current degree of proximity of the subject vehicle to the preceding vehicle. In the case where current driving conditions are continuous, that is, when the subject vehicle speed Vf, the preceding vehicle speed Va and the relative speed Vr are constant, TTC indicates how many seconds later the vehicle distance D will become zero and the subject vehicle and the preceding vehicle come into contact with each other. TTC can be obtained from the following expression 1.

$$TTC=D/Vr \qquad \text{(expression 1)}$$

As shown in expression 1, TTC is obtained by dividing the vehicle distance D by the relative speed Vr. As the value of TTC becomes smaller, a degree of proximity to the preceding vehicle becomes greater, which indicates tens situation with possible contact between the subject vehicle and the preceding vehicle.

THW is a physical quantity representing a predicted extent of influence on TTC due to future change in the preceding vehicle speed while the subject vehicle is following the preceding vehicle. In other words, THW represents the extent of influence upon TTC when it is assumed that the relative velocity Vr will change. THW is represented by the following expression 2.

$$THW=D/Vf \qquad \text{(expression 2)}$$

THW is obtained by dividing the vehicle distance D by the subject vehicle speed Vf, and represents a period of time until the subject vehicle reaches the current position of the preceding vehicle. If THW is large, there is not a lot of influence on the degree of proximity to preceding vehicle even if the preceding vehicle velocity changes in the future. It should be understood that, if the subject vehicle follows the preceding vehicle at the subject vehicle speed Vf equal to the preceding vehicle speed Va, it is also possible to calculate THW by substituting the preceding vehicle speed Va for the subject vehicle speed Vf in expression 2.

The risk potential RP with respect to the preceding vehicle is calculated using TTC and THW. The risk potential RP may be calculated using a reciprocal of TTC, 1/TTC, and a reciprocal of THW, 1/THW, with the following expression 3.

$$RP0=a/THW+b/TTC \qquad \text{(expression 3)}$$

Here, a and b are constants and are set, for example, to a=1 and b=8 (a<b).

In step S104, the AF increase amount F(RP) is calculated based on the risk potential RP calculated in step S103. The AF increase amount F(RP) increases as the risk potential RP becomes greater as shown in FIG. 5. For example, the AF increase amount F(RP) maybe set to be proportional to the risk potential RP with the following expression 4.

$$F(RP)=k \times RP \qquad \text{(expression 4)}$$

Here, k is a constant set appropriately.

In step S105, change rate dRP/dt of the risk potential RP calculated in step S103 is calculated. The change rate dRP/dt may be obtained by differentiating the risk potential RP with respect to time t.

Next, in step S106, it is decided as to whether or not the change rate dRP/dt of the risk potential RP calculated in step S105 is a positive value, in other words, whether the risk potential RP is increasing or decreasing. If an affirmative decision is made in step S106 so that the risk potential RP is increasing, the flow of control proceeds to step S107.

In step S107, the accelerator pedal operation amount S detected by the accelerator pedal stroke sensor 62 is read. Next in step S108, the operating speed Vp of the accelerator pedal 63 is calculated. Here, the operating speed Vp is calculated by differentiating the operation amount S with respect to time t (Vp=dS/dt). When the operating speed Vp thus calculated is a positive value, it means that the accelerator pedal 63 is operated in the direction of depressing, and when the operating speed Vp is a negative value, it means that the accelerator pedal 63 is operated in the direction of releasing.

Figure 7:
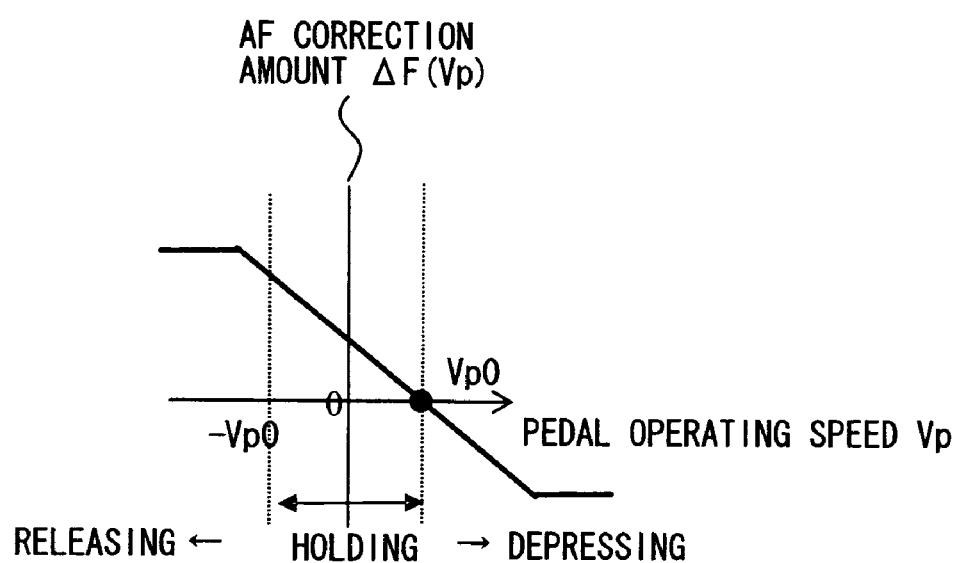
FIG. 7 is a figure showing a relationship between an accelerator pedal operation speed and a reaction force correction amount.

In step S109, the AF correction amount ΔF(Vp) is calculated based on the operating speed Vp of the accelerator pedal 63 calculated in step S108. A relationship between the accelerator pedal operating speed Vp and the AF correction amount ΔF(Vp) is shown in FIG. 7. A vertical axis of FIG. 7 represents the AF correction amount ΔF(Vp), and a horizontal axis represents the accelerator pedal operating speed Vp.

When the accelerator pedal operating speed Vp falls in a region where the operating speed Vp is a positive value and exceeds a predetermined value Vp0, it is assumed that the accelerator pedal 63 is being pressed down. When the accelerator pedal operating speed Vp falls in a region where the operating speed Vp is a negative value and is below a predetermined value −Vp0, it is assumed that the accelerator pedal 63 is being released. In addition, when the accelerator pedal operating speed Vp is within a region between the predetermined value −Vp0 and the predetermined value +Vp0 (−Vp0≦Vp≦+Vp0), it indicates that the accelerator pedal 63 is held at a substantially fixed position.

As shown in FIG. 7, when the accelerator pedal 63 is being depressed at an operating speed Vp faster than the predetermined value Vp0, the AF correction amount ΔF(Vp) is set so that the accelerator pedal reaction force F becomes smaller as the depressing speed Vp of the accelerator pedal 63 becomes larger. In this case, the AF correction amount ΔF(Vp) shows a negative value, and the absolute value of the amount ΔF(Vp) becomes larger as the operating speed Vp becomes faster.

On the other hand, when the operating speed Vp0 is equal to or less than the predetermined value Vp0, in other words, when the accelerator pedal 63 is held at a fixed position or being released, the AF correction amount ΔF(Vp) is set so that the accelerator pedal reaction force F becomes larger as a value of the operating speed Vp becomes smaller. The AF correction amount ΔF(Vp) becomes larger as the releasing speed Vp of the accelerator pedal 63 becomes higher. In this case, the AF correction amount ΔF(Vp) is indicated by a positive value.

If, on the other hand, a negative decision is made in step S106, the flow of control proceeds to step S112. In step S112, the AF correction amount ΔF(Vp) is set to 0 so as not to carry out adjustment to the accelerator pedal reaction force F when the risk potential RP decreases. After the AF correction amount ΔF(Vp) is determined in step S109 or S112 as described above, the flow of control proceeds step S110.

In step S110, the AF control amount ΔF is calculated by using the AF increase amount F(RP) according to the risk potential RP calculated in step S104 and the AF correction amount ΔF(Vp) according to the operating speed Vp of the accelerator pedal 63 calculated in step S109 or S112. The AF control amount AF is represented by the following expression 5.

$$\Delta F = F(RP) + \Delta F(Vp) \quad \text{(expression 5)}$$

The AF control amount ΔF is calculated by adding the AF correction amount ΔF(Vp) to the AF increase amount F(RP) as shown in expression 5.

In step S111, the AF control mount ΔF calculated in step S110 is output to the AF control device 60. The AF control device 60 controls the servo motor 61 so as to generate the operation reaction force in the accelerator pedal 63, which is obtained by adding the AF control amount ΔF input from the controller 30 to the normal reaction force characteristic Fini. The processing for this time then terminates.

In this way, with the first embodiment as explained above, the following advantage can be achieved.

(1) The controller 30 conveys the risk potential RP in the vehicle surroundings to the driver as the accelerator pedal reaction force F. At this time, the controller 30 adjusts the accelerator pedal reaction force F according to the driver's operating state of the accelerator pedal 63. Driver's perception of the accelerator pedal reaction force F, that is, how the driver perceives the reaction force of the accelerator pedal 63 is different depending on the operating state of the accelerator pedal 63. By correcting the accelerator pedal reaction force F, it is possible to reliably notify the risk potential RP around the subject vehicle to the driver. That is, the driver can feel the same accelerator pedal reaction force F when the risk potential RP is the same regardless of the operating state of the accelerator pedal 63, and it is possible to precisely convey the risk potential RP.

(2) The controller 30 detects the operating speed Vp and the direction in which the accelerator pedal 63 is operated, and corrects the accelerator pedal reaction force F according to the operating speed Vp and the operating direction. In this way, the operating state of the driver can be accurately detected, and it is possible to perform accelerator pedal reaction force control and convey the risk potential RP in a manner appropriate to the state of the driver's perception.

(3) The controller 30 corrects the accelerator pedal reaction force F, taking into account of the pushing-back force that the driver perceives from the accelerator pedal 63. More particularly, the accelerator pedal reaction force F is corrected to become smaller as the operating speed Vp becomes higher when the accelerator pedal 63 is being depressed, as shown in FIG. 7. On the other hand, the accelerator pedal reaction force F is corrected to become greater as the operating speed Vp becomes higher when the accelerator pedal 63 is being released. In this way, when the driver feels large pushing-back force, pressing down the accelerator pedal 63, the accelerator pedal reaction force F is set to become smaller. As a result, the risk potential RP can be reliably conveyed to the driver while maintaining the operativeness of the accelerator pedal 63. When the accelerator pedal 63 is being released, the accelerator pedal reaction force F is set to become greater. As a result, the risk potential RP can be reliably transmitted to the driver even in a situation that the driver perceives only a little pushing-back force from the accelerator pedal 63.

(4) The controller 30 determines as to whether the driver is depressing, holding, or releasing the accelerator pedal 63 according to the accelerator pedal operating speed Vp. It is arranged that correcting method of the accelerator pedal reaction force F used when the accelerator pedal 63 is being depressed is different from the method used when the accelerator pedal 63 is being held or released. When holding the accelerator pedal 63, that is, the operating speed Vp is within the predetermined range (−Vp0≦Vp≦Vp0), the driver's perception of the reaction force is substantially equal to that of when releasing the accelerator pedal 63. In other words, it is difficult for the driver to feel the pushing-back force from the accelerator pedal 63. Thus, when the operating speed Vp is equal to or smaller than the predetermined value Vp0, the accelerator pedal reaction force F is adjusted to become greater. In this way, it is possible to convey the risk potential RP to the driver.

First Embodiment Modification 1

Figure 8:
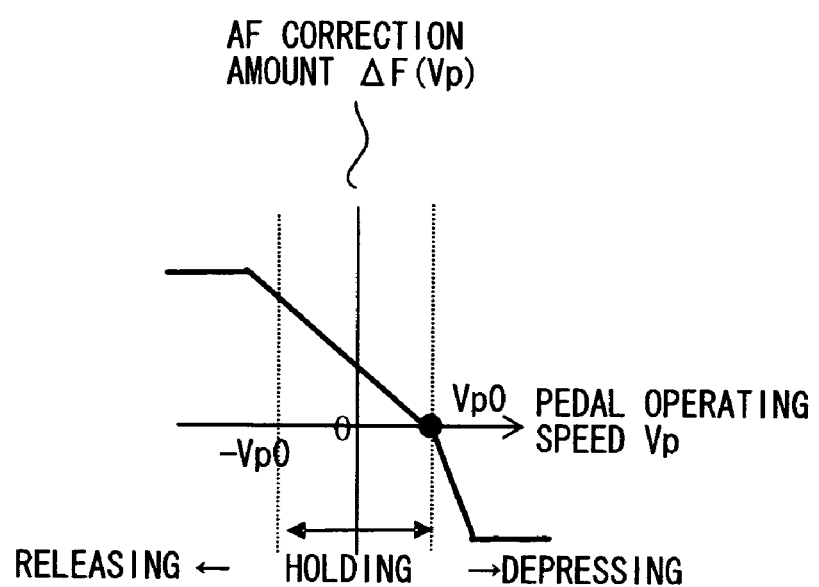
FIG. 8 is a figure showing a relationship between an accelerator pedal operation speed and a reaction force correction amount.

In step S109 of FIG. 6 as described above, the AF correction amount ΔF(Vp) was calculated using a map of FIG. 7 so that the driver can perceive the same reaction force F from the accelerator pedal when the risk potential RP is the same, regardless of the operating state of the accelerator pedal 63. Maps other than the map shown in FIG. 7 can be used if appropriate AF correction amount ΔF(Vp) can be calculated. FIG. 8 shows another example of a map of the AF correction amount ΔF(Vp) with respect to the accelerator pedal operating speed Vp.

The map shown in FIG. 8 is set so that a slope of the AF correction amount ΔF(Vp) when the accelerator pedal 63 is being depressed (Vp>Vp0) is different from a slope of the AF correction amount ΔF(Vp) when the accelerator pedal 63 is held or being released (Vp≦Vp0). More specifically, the slope of the AF correction amount ΔF(Vp) when depressing the accelerator pedal 63 is set to become larger than the slope of the AF correction amount ΔF(Vp) when holding or releasing the pedal.

Thus, when the driver is depressing the accelerator pedal 63 intently, the slope of the AF correction amount ΔF(Vp) is set to become larger than when the pedal is being held or released. In other words, extent of the accelerator pedal reaction force correction when depressing the accelerator pedal 63 is set larger than extent of the correction when holding or releasing the pedal, and moreover, the accelerator pedal reaction force F is adjusted to become smaller as the pedal depressing speed Vp increases.

The driver is sensitive to the pushing-back force from the accelerator pedal 63 when depressing the accelerator pedal 63 intently as explained above. Thus, in this case, the accelerator pedal reaction force F is adjusted to be smaller so as not to generate the reaction force F larger than necessary. In this way, the risk potential RP in the vehicle surroundings can be conveyed to the driver while maintaining operativeness of the accelerator pedal 63 when the driver is pressing down the pedal intently.

On the other hand, since the driver's perception of the accelerator pedal reaction force when holding the accelerator pedal 63 and when releasing the pedal is almost the same, the slope of the AF correction amount ΔF(Vp) is set to be constant in a region where the accelerator pedal operating speed Vp is equal to or smaller than the predetermined value Vp0. In this way, as the operating speed Vp of releasing the accelerator pedal 63 becomes higher, the accelerator pedal reaction force F is adjusted to be greater. Thus, the risk potential RP in the vehicle surroundings can be reliably conveyed to the driver even in situation where the driver is not sensitive to the pushing-back force from the accelerator pedal 63.

First Embodiment Modification 2

Figure 9:
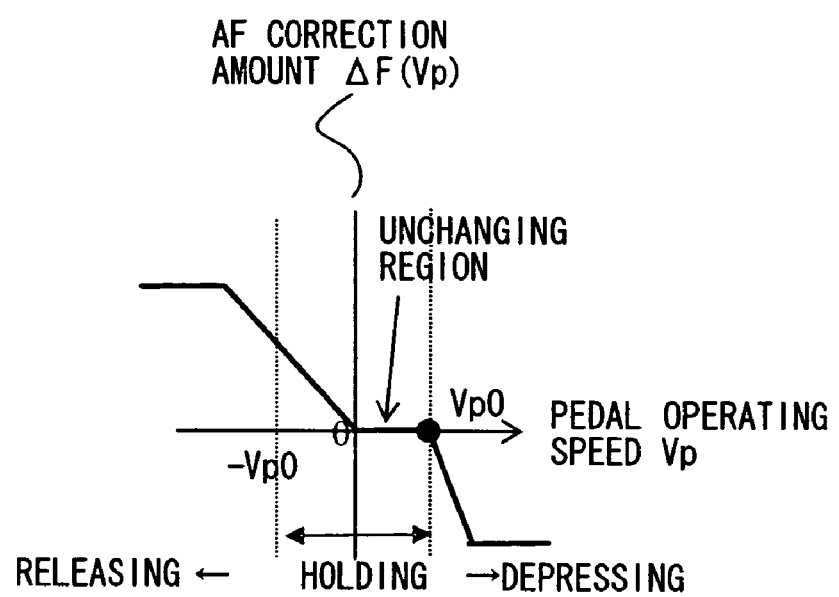
FIG. 9 is a figure showing a relationship between an accelerator pedal operation speed and a reaction force correction amount.

FIG. 9 shows another example of a map of the AF correction amount ΔF(Vp) with respect to the accelerator pedal operating speed Vp.

The map of FIG. 9 includes an unchanging region where the AF correction amount ΔF(Vp) does not vary even if the operating speed Vp changes, within a region where the accelerator pedal operating speed Vp is small. More particularly, as shown in FIG. 9, a range of the accelerator pedal operating speed Vp from 0 to the predetermined value Vp0 (0≦Vp≦Vp0) is taken as the unchanging region. In addition, a slope of the AF correction amount ΔF(Vp) when depressing the accelerator pedal 63 (Vp>Vp0) is set to be larger than a slope of the amount ΔF(Vp) when holding or releasing the accelerator pedal 63.

Since the unchanging region is included in the map of the AF correction amount ΔF(Vp), the accelerator pedal reaction force F does not vary needlessly in response to slight change in the pedal operating speed Vp when holding the accelerator pedal 63 at small operating speed Vp. In this way, the reaction force control system can be stabilized. In addition, the slope of the AF correction amount ΔF(Vp) when the accelerator pedal 63 is being depressed is set to be larger. Thus, as the depressing speed Vp becomes higher, an absolute value of the AF correction amount ΔF(Vp) becomes greater to reduce the AF control amount ΔF. As a result, the risk potential RP in the vehicle surroundings can be conveyed to the driver while maintaining operativeness of the pedal when the driver is depressing the accelerator pedal 63 intently.

Second Embodiment

Next, a vehicle driving assist system according to a second embodiment of the present invention will be described.

The structure of the vehicle driving assist system of the second embodiment is identical to that of the first embodiment, and thus, its explanation is omitted. Here, explanation will focus on points that differentiate the second embodiment from the first embodiment.

In the second embodiment, only the processing of the AF correction amount calculation in step S109 in the flow chart of FIG. 6 differs from the first embodiment described above. In the first embodiment, the accelerator pedal reaction force F was corrected, taking account of the pushing-back force that the driver perceives when operating the accelerator pedal 63. In the second embodiment, the accelerator pedal reaction force F will be corrected, taking account of driver's sensitivity to the accelerator pedal reaction force F when operating the accelerator pedal 63.

When operating the accelerator pedal 63, the driver feels the operation reaction force of the accelerator pedal 63 as a pushing-back force acting to release the pedal. The driver becomes more sensitive to the pushing-back force as he operates the accelerator pedal 63 more intently. That is, when the driver operates the accelerator pedal 63 quickly with intention, driver's sense sharpens and he can recognize the accelerator pedal reaction force F easily, whether he is depressing or releasing the accelerator pedal 63.

On the other hand, when the driver does not operate the accelerator pedal 63 intently or operates it aimlessly, the driver tends to become insensitive to the accelerator pedal reaction force F. Especially, if the risk potential RP increases and the accelerator pedal reaction force F increases gradually while the driver is holding the accelerator pedal 63, the accelerator pedal 63 may move slowly back to its neutral position along with increase in the reaction force F. In this case, the driver may not recognize increase in the accelerator pedal reaction force F.

Accordingly, the accelerator pedal reaction force F is corrected, taking account of driver's sensitivity to the accelerator pedal reaction force F, in order to precisely notify the risk potential RP in the vehicle surroundings to the driver regardless of the operating state of the driver.

Figure 10:
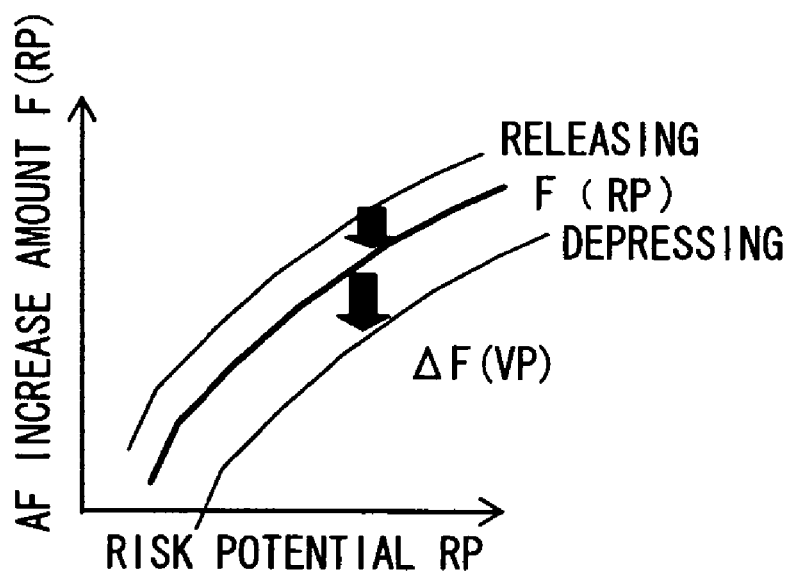
FIG. 10 illustrates the concept of reaction force correction in a second embodiment.

FIG. 10 schematically illustrates the relationship among the risk potential RP, the AF increase amount F(RP), and the AF correction amount ΔF(Vp).

The AF increase amount F(RP) increases as the risk potential RP becomes greater. When the accelerator pedal 63 is being depressed as shown in FIG. 10, the AF increase amount F(RP) is adjusted by setting the AF correction amount ΔF(Vp) appropriately so that the accelerator pedal reaction force F decreases as the depressing speed Vp becomes higher. On the other hand, when the accelerator pedal 63 is being released, the AF increase amount F(RP) is adjusted by setting the AF correction amount ΔF(Vp) so that the accelerator pedal reaction force F becomes greater as the releasing speed Vp becomes slower. Moreover, the AF increase amount F(RP) is adjusted so that the accelerator pedal reaction force F becomes relatively small as the accelerator pedal 63 is being released quickly.

Figure 11:
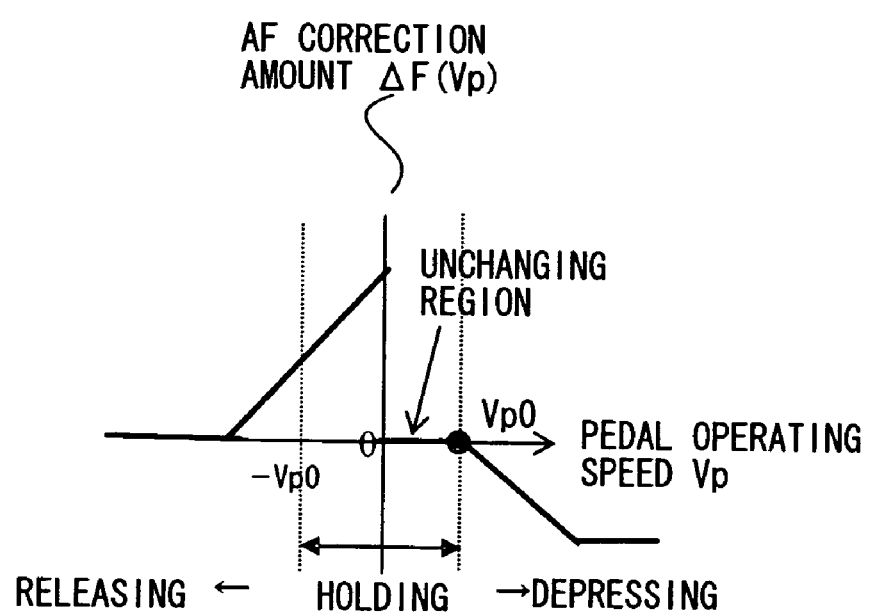
FIG. 11 is a figure showing a relationship between an accelerator pedal operation speed and a reaction force correction amount.

FIG. 11 shows an example of a map of the AF correction amount ΔF (Vp) with respect to the accelerator pedal operating speed Vp. As shown in FIG. 11, when the accelerator pedal 63 is being depressed at an operating speed Vp faster than the predetermined value Vp0, the AF correction amount ΔF(Vp) is set so that the accelerator pedal reaction force F becomes smaller as the depressing speed Vp of the accelerator pedal 63 becomes higher. In this case, the AF correction amount $\Delta F(Vp)$ is indicated by a negative value, and the absolute value of the amount $\Delta F(Vp)$ becomes larger as the operating speed Vp becomes faster.

A range of the accelerator pedal operating speed Vp from 0 to the predetermined value Vp0 ($0 \leq Vp \leq Vp0$) is set as an unchanging region where the AF correction amount $\Delta F(Vp)$ does not vary even if the operating speed Vp changes. When the operating speed Vp is below 0, the AF correction amount $\Delta F(Vp)$ becomes larger as the operating speed Vp approaches to 0 or becomes slower. That is, when the accelerator pedal 63 is held or being released at the operating speed Vp<0, the AF correction amount $\Delta F(Vp)$ is set to become greater as the accelerator pedal 63 is operated slowly and the absolute value of the operating speed Vp becomes smaller.

The AF control amount $\Delta F$ to be actually output to the AF control device 60 is calculated by adding the AF correction amount $\Delta F(Vp)$ calculated according to the map of FIG. 11 to the AF increase amount F(RP) calculated according to the risk potential RP as represented in expression 5.

In the second embodiment, as described above, the accelerator pedal reaction force F is adjusted, taking driver's sensitivity to the accelerator pedal reaction force F into consideration. More particularly, when depressing the accelerator pedal 63, the accelerator pedal reaction force F is corrected to become smaller as the operating speed Vp becomes higher. On the other hand, when releasing the accelerator pedal 63 (Vp<0), the accelerator pedal reaction force F is corrected to become larger as the operating speed Vp becomes slower. In this way, the risk potential RP in the vehicle surroundings can be reliably conveyed to the driver by increasing the accelerator pedal reaction force F when the driver operates the accelerator pedal 63 slowly and is insensitive to the reaction force. For instance, even when the accelerator pedal 63 is gradually moved back to its neutral position in response to increase in the accelerator pedal reaction force F, it is possible to reliably convey the risk potential RP to the driver by increasing the accelerator pedal reaction force F further more.

On the other hand, when the driver intently operates the accelerator pedal 63 quickly and his sense to the reaction force is sharp, the accelerator pedal reaction force F is set to become smaller so that the risk potential RP can be conveyed to the driver without disturbing driver's operation of the accelerator pedal 63.

In addition, a region where the depressing speed Vp of the accelerator pedal 63 is small and less than the predetermined value Vp0 is set as the unchanging region of the AF correction force $\Delta F(Vp)$. In this way, the accelerator pedal reaction force F does not change in response to slight change in the operating speed Vp while the driver is holding the accelerator pedal 63. Accordingly, the reaction force control system can be stabilized.

Third Embodiment

A third embodiment of the present invention will be described below.

In the third embodiment, only the calculation method of the AF correction amount $\Delta F(Vp)$ is different from the second embodiment described above. In the third embodiment, similarly to the second embodiment, the AF correction amount $\Delta F(Vp)$ is calculated, taking account of driver's sensitivity to the accelerator pedal reaction force F.

Figure 12:
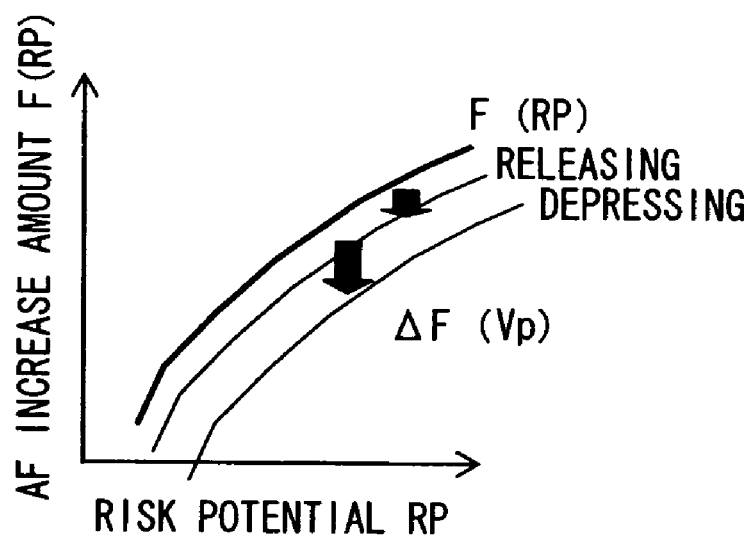
FIG. 12 illustrates the concept of reaction force correction in a third embodiment.

FIG. 12 schematically illustrates the relationship among the risk potential RP, the AF increase amount F(RP), and the AF correction amount $\Delta F(Vp)$. The AF increase amount F(RP) increases as the risk potential RP becomes greater.

As shown in FIG. 12, the AF increase amount F(RP) is adjusted by setting the AF correction amount $\Delta F(Vp)$ so that the accelerator pedal reaction force F becomes smaller as the operating speed Vp becomes higher, whether the accelerator pedal 63 is being depressed or released. When the accelerator pedal 63 is being depressed, extent of adjustment to the AF increase amount F(RP) with respect to the operating speed Vp is greater compared to when the accelerator pedal 63 is being released. The accelerator pedal reaction force F is adjusted to become smaller as the depressing speed Vp of the accelerator pedal 63 becomes higher.

Figure 13:
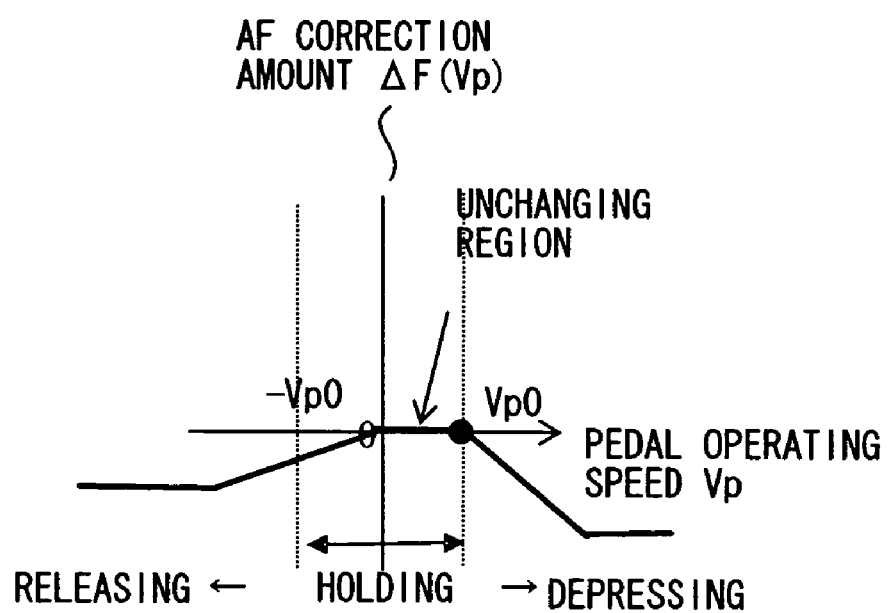
FIG. 13 is a figure showing a relationship between an accelerator pedal operation speed and a reaction force correction amount.

FIG. 13 shows an example of a map of the AF correction amount $\Delta F(Vp)$ with respect to the accelerator pedal operating speed Vp. As shown in FIG. 13, when the accelerator pedal 63 is being depressed at an operating speed Vp faster than the predetermined value Vp0, the AF correction amount $\Delta F(Vp)$ is set so that the accelerator pedal reaction force F becomes smaller as the depressing speed Vp of the accelerator pedal 63 becomes higher. In this case, the AF correction amount $\Delta F$ (Vp) is indicated by a negative value, and the absolute value of the amount $\Delta F(Vp)$ becomes larger as the operating speed Vp becomes faster.

A range of the accelerator pedal operating speed Vp from 0 to the predetermined value Vp0 ($0 \leq Vp \leq Vp0$) is set as an unchanging region where the AF correction amount $\Delta F(Vp)$ does not vary even if the operating speed Vp changes. When the operating speed Vp is less than 0, the AF correction amount $\Delta F(Vp)$ is set to reduce the accelerator pedal reaction force F as the operating speed Vp lowers. In this case, the operating speed Vp and the AF correction amount $\Delta F(Vp)$ are indicated by negative values, and the absolute value of the amount $\Delta F(VP)$ increases as the releasing speed Vp of the accelerator pedal 63 becomes higher.

As shown in FIG. 13, while the absolute value of the AF correction amount $\Delta F(Vp)$ increases as the operating speed Vp becomes higher either when depressing or releasing the accelerator pedal 63, slopes of the AF correction amount $\Delta F(Vp)$ are different between the depressing of the accelerator pedal 63 and the releasing. The map of FIG. 13 is arranged so that a change rate of the AF correction amount $\Delta F(Vp)$ with respect to the operating speed Vp when depressing the accelerator pedal 63 is larger than a change rate the AF correction amount $\Delta F(Vp)$ with respect to the operating speed Vp when releasing the accelerator pedal 63.

The AF control amount AF to be actually output to the AF control device 60 is calculated by adding the AF correction amount $\Delta F(Vp)$ calculated according to the map of FIG. 13 to the AF increase amount F(RP) calculated according to the risk potential RP as represented in expression 5.

In the third embodiment, similarly to the second embodiment described above, the accelerator pedal reaction force F has been adjusted, taking account of the driver's sensitivity to the accelerator pedal reaction force F. More particularly, the accelerator pedal reaction force F is corrected to become smaller as the operating speed Vp becomes higher when the accelerator pedal 63 is being depressed, as shown in FIG. 13. When the accelerator pedal 63 is being released, the accelerator pedal reaction force F is also corrected to become smaller as the operating speed Vp becomes higher. That is, when the driver operates the accelerator pedal 63 intently and quickly and is sensitive to the reaction force, the accelerator pedal reaction force F is made to be smaller. In this way, the risk potential RP can surely be conveyed to the driver without disturbing driver's operation of the accelerator pedal 63.

In addition, since a region where the depressing speed Vp of the accelerator pedal 63 is slow and less than the predetermined value Vp0 is set as the unchanging region, the accelerator pedal reaction force F does not vary in response to slight change in the operating speed Vp while the accelerator pedal 63 is being held. In this way, the reaction force control system can be stabilized.

A slope of the AF correction amount ΔF(Vp) in case of depressing the accelerator pedal 63 is set larger than a slope of the amount ΔF(Vp) in case of releasing the accelerator pedal 63. In this way, as the depressing speed Vp becomes larger, the absolute value of the AF correction amount ΔF(Vp) increases furthermore to reduce the AF control amount ΔF. Accordingly, the risk potential RP in the vehicle surroundings can be notified to the driver while maintaining operativeness of the pedal when the driver is depressing the accelerator pedal 63 intently.

In the first through third embodiments described above, an explanation was given in that the AF increase amount F(RP) increases linearly with respect to increase in the risk potential RP. It would also be possible to set the AF increase amount F(RP) to increase according to an exponential function with respect to the risk potential RP. Moreover, in the first through third embodiments, the risk potential RP in the vehicle surroundings was calculated using TTC and THW, but the present invention is not to be limited by this feature. For example, the risk potential RP may be calculated using only TTC, instead.

In the first through third embodiments as described above, the AF correction amount ΔF(Vp) was set to be 0 when the risk potential RP was decreasing, but the present invention is not to be limited by this feature. For instance, when the risk potential RP is decreasing, it would be also possible to gradually reduce the AF correction amount ΔF(Vp).

In the first through third embodiments as described above, the AF correction amount ΔF(Vp) was set to vary linearly with respect to the accelerator pedal operating speed VP, but the present invention is not to be considered as being limited by this feature. That is, as long as the accelerator pedal reaction force F is appropriately adjusted according to the operating speed Vp and a direction of its operation, the AF correction amount map can be modified. Moreover, if the accelerator pedal reaction force F can be appropriately adjusted according to the operating state of the accelerator pedal 63, the risk potential RP can be corrected according to the operating speed Vp and a direction of its operation. That is, it is possible to correct either the AF control amount ΔF or the risk potential RP to appropriately adjust the accelerator pedal reaction force F. In addition, it would be also possible to correct both of the AF control amount ΔF and the risk potential RP.

The correcting methods of the accelerator pedal reaction force F as described in the first through third embodiments may be applied to operation reaction force control of a brake pedal.

In the first through third embodiments, the vehicle condition and driving environment of the vehicle surroundings was detected by using the laser radar 10 and the vehicle speed sensor 20. However, the present invention is not thus limited, and it is also possible to use, for example, other type of detectors instead of the laser radar 10 such as milliwave radar, a CCD camera or a CMOS camera to detect the vehicle condition and driving environment.

The above described embodiments are examples, and various modifications can be made without departing from the spirit and scope of the invention.

The disclosure of the following priority application is herein incorporated by reference:

Japanese Patent Application No. 2002-355232 filed Dec. 6, 2002

What is claimed is:

1. A driving assist system for a vehicle, comprising:
    a driving state recognition device configured to detect a vehicle condition and a traveling environment of a subject vehicle;
    a risk potential calculation device configured to calculate risk potential associated with the subject vehicle based on the detected vehicle condition and the detected traveling environment;
    a reaction force control device configured to control an operation reaction force applied to a vehicle operating unit, based on the calculated risk potential;
    an operating state detection device configured to detect an operating state of the vehicle operating unit operated by a driver to control the subject vehicle, wherein the operating state of the vehicle operating unit includes an operating direction of the vehicle operating unit; and
    a reaction force correction device configured to correct the operation reaction force applied to the vehicle operating unit, based on the operating state of the vehicle operating unit.

2. A driving assist system for a vehicle according to claim 1, wherein:
    the vehicle operating unit is an accelerator pedal;
    the operating state of the vehicle operating unit further includes an operating speed of the accelerator pedal detected by the operating state detection device; and
    the reaction force correction device is configured to correct the operation reaction force of the accelerator pedal, according to the operating speed and the operating direction of the accelerator pedal.

3. A driving assist system for a vehicle according to claim 2, wherein the reaction force correction device (a) reduces the operation reaction force in response to an increasing accelerator pedal operating speed when the accelerator pedal is being depressed, and (b) increases the operation reaction force in response to an increasing accelerator pedal operating speed when the accelerator pedal is being released.

4. A driving assist system for a vehicle according to claim 3, wherein:
    the reaction force correction device sets a correction amount of the operation reaction force at a larger amount when the accelerator pedal is being depressed, than the correction amount of the operation reaction force when the accelerator pedal is being released.

5. A driving assist system for a vehicle according to claim 3, wherein the reaction force correction device sets a relationship between the accelerator pedal operating speed and a correction amount of the operation reaction force to include a region where the correction amount of the operation reaction force does not vary with a change in the accelerator pedal operating speed in a range when the accelerator pedal operating speed is lower than a predetermined value.

6. A driving assist system for a vehicle according to claim 3, wherein the reaction force correction device increases the operation reaction force in response to an decreasing accelerator pedal operating speed when the accelerator pedal is depressed at an accelerator pedal operating speed lower than a predetermined value.

7. A driving assist system for a vehicle according to claim 2, wherein the reaction force correction device (a) reduces the operation reaction force in response to an increasing accelerator pedal operating speed when the accelerator pedal is being depressed, and (b) increases the operation reaction force in response to a decreasing accelerator pedal operating speed when the accelerator pedal is being released.

8. A driving assist system for a vehicle according to claim 2, wherein the reaction force correction device (a) reduces the operation reaction force in response to an increasing accelerator pedal operating speed when the accelerator pedal is being depressed, and (b) reduces the operation reaction force in response to a decreasing accelerator pedal operating speed when the accelerator pedal is being released.

9. A driving assist system for a vehicle according to claim 8, wherein the reaction force correction device sets a correction amount of the operation reaction force at a larger amount when the accelerator pedal is being depressed, than the correction amount of the reaction force when the accelerator pedal is being released.

10. A driving assist system for a vehicle according to claim 7, wherein the correction amount of the operation reaction force does not vary with a change in the accelerator pedal operating speed in a range when the accelerator pedal operating speed is slower than a predetermined value.

11. A driving assist system for a vehicle according to claim 8, wherein the reaction force correction device sets a relationship between the accelerator pedal operating speed and correction amount of the operation reaction force to include a region where the correction amount of the operation reaction force does not vary with a change in the accelerator pedal operating speed in a range when the accelerator pedal operating speed is slower than a predetermined value.

12. A driving assist system for a vehicle according to claim 1, wherein the reaction force correction device sets a correction amount of the operation reaction force to be substantially 0 when the calculated risk potential is decreasing.

13. A driving assist system for a vehicle, comprising:
a driving state recognition means for detecting a vehicle condition and a traveling environment of a subject vehicle;
a risk potential calculation means for calculating risk potential associated with the subject vehicle based on the detected vehicle condition and the detected traveling environment;
a reaction force control means for controlling an operation reaction force applied to a vehicle operating unit, based on the calculated risk potential;
an operating state detection means for detecting an operating state of the vehicle operating unit operated by a driver to control the subject vehicle, wherein the operating state of the vehicle operating unit includes an operating direction of the vehicle operating unit; and
a reaction force correction means for correcting the reaction force applied to the vehicle operating unit, based on the operating state of the vehicle operating unit.

14. A vehicle driving assist method, comprising:
detecting a vehicle condition and a traveling environment of a subject vehicle;
calculating risk potential associated with the subject vehicle based on the detected vehicle condition and the detected traveling environment;
detecting an operating state of a vehicle operating unit operated by a driver to control the subject vehicle, wherein the operating state of the vehicle operating unit includes an operating direction of the vehicle operating unit; and
controlling an operation reaction force applied to the vehicle operating unit, based on the risk potential and the operating state of the vehicle operating unit.

15. A vehicle, comprising:
a vehicle operating unit;
a driving state recognition device configured to detect a vehicle condition and a traveling environment of the vehicle;
a risk potential calculation device configured to calculate risk potential associated with the vehicle based on the vehicle condition and the traveling environment;
a reaction force control device configured to control an operation reaction force applied to the vehicle operating unit, based on the calculated risk potential;
an operating state detection device configured to detect an operating state of the vehicle operating unit operated by a driver to control the vehicle, wherein the operating state of the vehicle operating unit includes an operating direction of the vehicle operating unit; and
a reaction force correction device configured to correct the operation reaction force applied to the vehicle operating unit, based on the operating state of the vehicle operating unit.

* * * * *